UNITED STATES PATENT OFFICE.

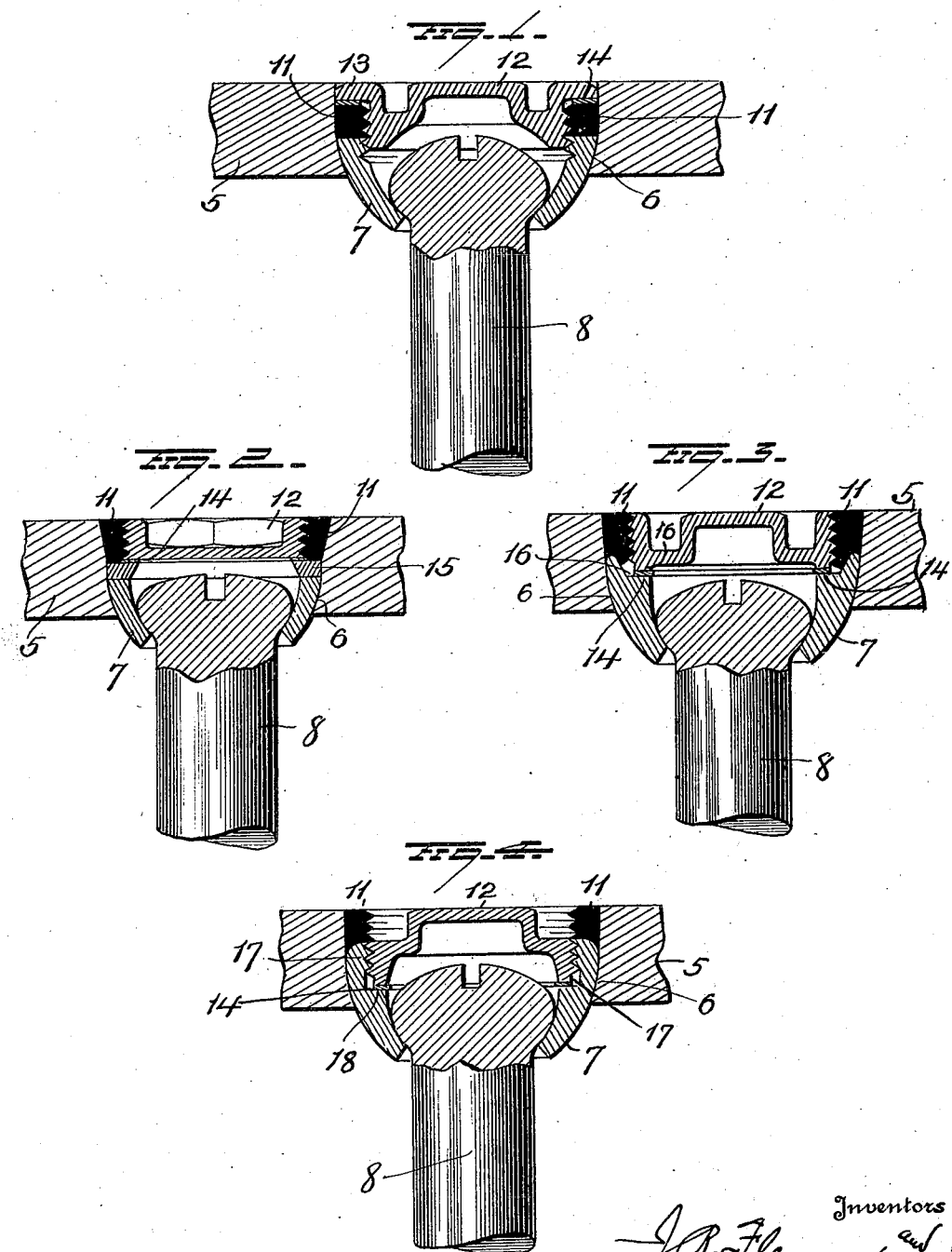

JOHN ROGERS FLANNERY, OF PITTSBURGH, PENNSYLVANIA, AND ETHAN I. DODDS, OF CENTRAL VALLEY, NEW YORK, ASSIGNORS TO FLANNERY BOLT COMPANY, OF PITTSBURGH, PENNSYLVANIA.

STAYBOLT STRUCTURE.

1,401,684.     Specification of Letters Patent.     Patented Dec. 27, 1921.

Application filed February 16, 1921. Serial No. 445,454.

*To all whom it may concern:*

Be it known that we, JOHN ROGERS FLANNERY and ETHAN I. DODDS, citizens of the United States, and residents of Pittsburgh and Central Valley, in the counties of Allegheny and Orange and States of Pennsylvania and New York, respectively, have invented certain new and useful Improvements in Staybolt Structures; and we do hereby declare the following to me a full, clear, and exact description of the invention, such as will enable others skilled in the art to which it appertains to make and use the same.

Our invention relates to an improvement in staybolt structures, the object being to provide improved means for permanently securing the bolt bearing member to the outer sheet of the boiler, and for securing the cap over the bolt head, and it consists in mounting the bolt bearing member in the outer sheet, securing the said member in place by a built up weld located within the seat for the bearing member above the latter and then threading said built up part for the attachment of a threaded cap.

It further consists in the detail of construction as will be more fully explained and pointed out in the claims.

In the accompanying drawings Figure 1 is a view in section of one embodiment of our invention and Figs. 2, 3 and 4 are views of modified constructions.

5 represents the outer sheet of a boiler having a bolt opening which may be straight from the outer surface for a portion of its depth, or conical as shown in Fig. 2, and curved as at 6 from the said straight or conical portion to form the seat for the bearing member 7. The curvature of the seat is in the arc of a circle and the bearing member is in the form of the segment of a circle and of such size at its upper end as to engage the curved seat and be held therein against inward displacement. This bearing member may be initially adjusted so that its long axis will be coincident with the long axis of the bolt 8 when the latter is secured to the inner sheet (not shown) and it is provided internally with a curved seat on which the head of the stay bolt 8 rests and on which it is free to move to accommodate itself to the movement of the inner and outer sheets of the boiler.

After the bearing member has been seated and properly adjusted in the bolt opening in the outer sheet of the boiler, it is permanently secured by a built up weld 11 within the bolt opening and above the bearing member. This built up weld is preferably formed by fusing a welding compound or material to the wall of the opening and the top edge of the bearing member as shown in Fig. 1. In forming or building up the weld, a core is inserted within the bearing member with a space sufficient between the periphery of the core and the wall of the bolt opening for the welding material which is then fused thereon. After the weld has been formed, the core is removed and the weld and upper end of the bearing member threaded to receive the cap 12.

In the construction shown in Fig. 1 the cap 12 is threaded to engage threads at the upper end of the bearing member and the built up weld, and is provided with a flange 13 which overlaps the weld and bears against a gasket 14.

In the construction shown in Fig. 2, an idler ring 15 is seated on the upper or outer end of the bearing member 7 and forms the seat on which the weld is built up. With this construction the bearing member is not directly welded to the outer sheet but the construction is such that after the weld has been formed there can be no movement of the bearing member, nor can it be removed without cutting out the built up weld 11. With this latter construction the flange 13 on the cap has been dispensed with and the latter seats directly on the idler ring 15 which projects inwardly beyond the weld.

In the construction shown in Fig. 3 the built up weld is formed directly on the upper end of the bearing member as in Fig. 1 but the flange 13 of the cap of the latter is dispensed with and an inwardly projecting flange 16 integral with the cap bears on a gasket seated on the upper end of bearing member 7, the built up weld being threaded to receive the threads on the cap.

In Fig. 4 the built up weld 11 is directly on the outer end of the bearing member as in Figs. 1 and 3. Instead however of having the cap, when in position, engage threads on both the weld and the bearing member as in Fig. 1, or engage threads on the weld alone as in Figs. 2 and 3, the upper end of the bearing member is recessed and threaded as at 17 to engage the threads on the cap. The weld is also threaded to permit of the removal and replacement of the cap, but the latter when in its normal position engages the threads on the bearing member only, the inner edge resting on a shoulder 18 formed in the bearing member for securing a steam tight joint.

With all these constructions the cap is removable for the ready inspection of the bolt, but the bearing member is fixed and immovable after its initial adjustment and can only be removed by cutting out the built-up portion or weld 11.

It is evident that many slight changes might be resorted to in the relative arrangement of parts shown and described without departing from the spirit and scope of our invention hence we would have it understood that we do not confine ourselves to the exact construction and arrangement of parts shown and described but, Having fully described our invention what we claim as new and desire to secure by Letters-Patent, is:—

1. In a stay bolt construction, the combination of an outer sheet having a stay bolt opening the latter being widest at the outer face of the sheet, a bolt bearing member seated within said opening with its outer edge intermediate the inner and outer surface of the boiler sheet, a built up weld intermediate the outer end of the bearing member and the outer surface of the sheet and locking the bearing member within the bolt opening, and a cap closing the outer end of the bearing member.

2. In stay bolt construction, the combination of an outer sheet having a stay bolt opening the greatest diameter of the latter being at the outer surface of the sheet, a bolt bearing member seated within said opening with its outer and larger end intermediate the inner and outer surfaces of the sheet, a built up weld on the wall of the opening at the outer side of the bearing member, and threaded to engage the threads on a cap, and a threaded cap to engage the threads in said built up weld.

3. In stay bolt construction, the combination of an outer sheet having a stay bolt opening the greatest diameter of the latter being at the outer surface of the sheet, a bolt bearing member seated within said opening with its outer and larger diameter intermediate the inner and outer surfaces of the sheet, a built up weld on the wall of the opening and on the outer end of the bearing member and threaded to engage the threads on a cap and a threaded cap to engage the threads in the built up weld and also in the bearing member.

4. In stay bolt construction, the combination of an outer sheet having a stay bolt opening widest at its outer side, a bolt bearing member seated in said opening, a built up welded wall over the outer end of said bearing member the said built up wall and outer end of the bearing member being threaded and a screw cap engaging the threads in said parts and having a flange overlapping the built up wall to form a steam tight joint.

In testimony whereof, we have signed this specification in the presence of a subscribing witness.

JOHN ROGERS FLANNERY.
ETHAN I. DODDS.

Witness:
EDWIN SPENCER RYCE.